April 23, 1935.                J. L. MRAZ                1,998,518
                             TUBULAR JOINT
                        Original Filed April 2, 1927
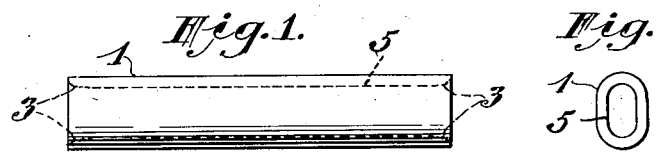
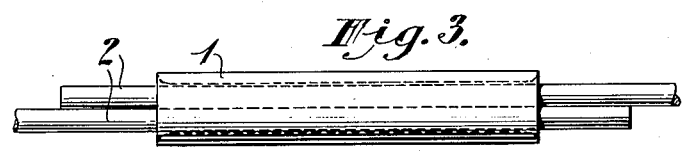
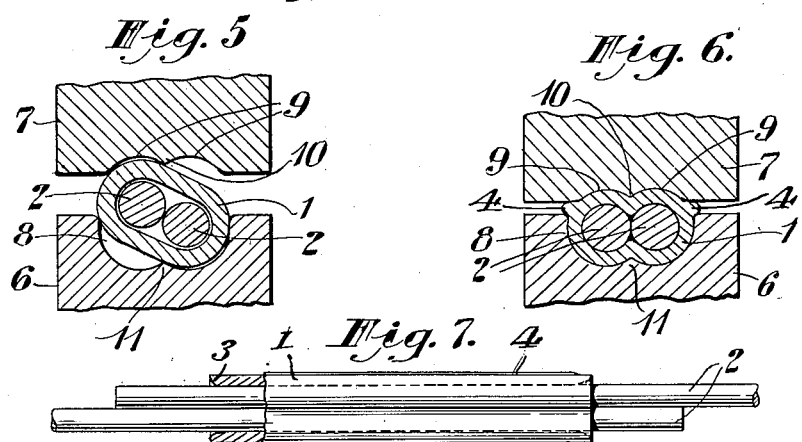
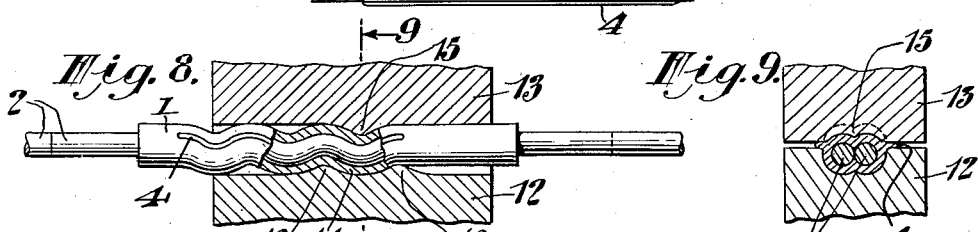
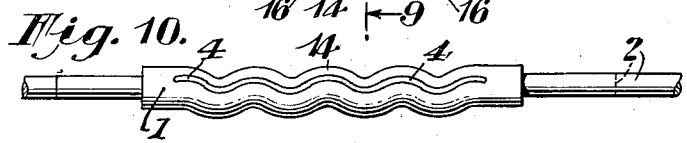
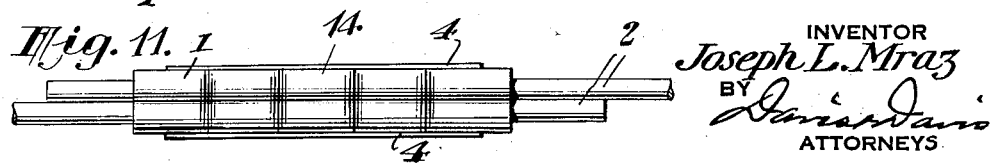
INVENTOR
Joseph L. Mraz
BY
ATTORNEYS Patented Apr. 23, 1935

1,998,518

UNITED STATES PATENT OFFICE 1,998,518

TUBULAR JOINT

Joseph L. Mraz, Waterbury, Conn.

Original application April 2, 1927, Serial No. 180,390, now Patent No. 1,727,895. Divided and this application November 16, 1929, Serial No. 407,664. Renewed March 21, 1934

4 Claims. (Cl. 287—78)

An important object of the present invention is to provide an improved joint between the ends of two electrical conductors.

Another object of the invention is to provide a simple, compact, close joint of great tensile strength between a tubular metal structure and a pair of wires, cables, rods or the like.

Other objects of the invention will appear hereinafter.

This application is a division of my application, Serial No. 180,390, filed April 2, 1927. Said prior application is now Patent No. 1,727,895.

In the drawing, Fig. 1 is a side view of the joint sleeve or tube;

Fig. 2 an end view of the sleeve;

Fig. 3 a plan view, showing two strands of wire inserted into the sleeve;

Fig. 4 a side view showing the operation of compressing the sleeve;

Figs. 5 and 6 enlarged cross sectional views showing different stages of the compression operation;

Fig. 7 a plan view of the finished joint partly in section;

Fig. 8 a longitudinal section showing the operation of forming another type of joint;

Fig. 9 a transverse section taken on the line 9—9 of Fig. 8; and

Figs. 10 and 11 a side view and a plan respectively of said second type of joint.

To form one of my improved joints between two electric wires, I first provide a tubular connector sleeve 1 having an oblong cross section. This sleeve is preferably formed of copper but any suitable material may be used and the sleeve is preferably seamless and continuous in cross section, as shown. The oblong bore or passage 5 through the sleeve is straight and of a shape and size to accommodate the two wires side by side and provide a slight clearance around them, and the ends of the bore are flared outwardly as at 3 to form bell-shaped entrances for the wires.

The ends of the circuit wires 2 are inserted into the opposite ends of the passage 5 and passed entirely through it and for a short distance beyond. Within the tube therefore the wires longitudinally overlap and lie side by side. The tube is next compressed about the wires in a manner to intimately and permanently unite it with them. In the present instance this compression is performed by two die members 6 and 7 which are engaged with opposite sides of the tube. Although I have shown die members in the form of blocks they may be of any other suitable form, as rollers, for example. Also, one die member may be in the form of a long support for the tube and the other member in the form of a roller. The die member 6 is formed with a relatively deep, straight groove 8 and the die member 7 is formed with two straight shallow grooves 9, side by side and separated by a longitudinal rib 10. Die member 6 is centrally formed with a similar rib 11 directly opposed to rib 10. The groove faces of both die members are rounded to engage substantially the entire periphery of the tube in the last stage of the compression. It will be understood that the relative proportions of the die members may be varied to suit different requirements.

The width of the deep groove 8 of the member 6 is slightly less than the major width of the sleeve, and the sleeve and its enclosed wires are placed diagonally within said groove with one end of the cross section of the sleeve disposed in the bottom of the groove and the other end projecting out of the groove as shown in Fig. 5. One of the shallow grooves 9 of the other die member is engaged with the projecting portion of the diagonally disposed sleeve and the die members are pressed together. Closing movement of the dies will force the sleeve into groove 8 and the sleeve will be transversely compressed and distorted between the opposite side walls of the groove, the sides of the tube will be forced into tight engagement with the enclosed wires at diametrically opposite points, and the wires will be forced together into close, side-to-side contact within the sleeve. As the sleeve descends into the groove 8 the opposed ribs 10 and 11 of the die members, by their engagement with the portions of the sleeve extending between the wires, prevent the sleeve from expanding at these points under the stress of the said lateral or transverse compression, and force the metal of the sleeve inwardly between the wires. When the sleeve has been forced against the bottom of the groove 8, as shown in Fig. 6, its cross section is almost entirely surrounded by the opposed concave die faces and a compression thereof will force the metal of the sleeve into intimate binding engagement with the peripheral surfaces of the enclosed wires around substantially three-quarters of the circumference of each strand. The metal of the tube is compressed and is made more dense and hard. This increases the tensile strength of the metal. In some cases some of the tube metal is squeezed outward between the dies to form narrow longitudinal ribs 4 at opposite sides of the tube. These ribs indicate that the metal of the sleeve has been compressed and molded and not merely folded around the wires.

It will be seen that to get this result the sleeve is first transversely compressed in one direction between the side walls of groove 8 and next compressed in a direction substantially at right angles to the first compression by the opposed die faces. During the second compression the close contact of the sleeve with the wires at diametrically opposite points, and the close side to side contact of the wires with each other, both caused by the first compression, are maintained. This close side to side contact of the wires, therefore, exists in the finished joint and, combined with said close engagement of the sleeve with the wire peripheries, produces a good, close joint. Heat is generated in the metal by the compression and consequently when the sleeve cools it contacts into a still stronger binding engagement with the wires.

The die members are forced together by either sustained pressure or by blows. In many cases, as for example in the forming of joints of material size, the die members will be materially shorter than the sleeve or tube and they will be shifted therealong to perform a series of compressing operations until substantially the entire length of the tube has been compressed. When the wire and the tube have been united as described the tube becomes in effect a permanent, integral part of the wires, and the electrical conductivity of the wires will be equal to that of a continuous wire.

In Figs. 8 and 9 I have illustrated a manner of forming a lapped wire joint having great tensile strength in addition to possessing all of the advantages of the straight joint just described. A tube of the form shown in Fig. 1 is used in forming this joint also and the wires are inserted into the tube as shown in Fig. 3. I now operate upon the tube by die members 12 and 13 having substantially the same cross sectional form as the die members 6 and 7 but differing from them in longitudinal section. The groove surfaces of the die members are formed in longitudinal section to force the inner portion of the tube and the enclosed portions of the lapped wires out of the plane in which the wires lie and form a curved bend 14. To accomplish this the die member 13 is formed upon its working face with a tube-flexing projection or hump 15 and the companion die member 12 is formed with two tube-flexing projections or humps 16 equally spaced at opposite sides of a center line through the projection 15. In side contour, the peaks of the projections 15 and 16 are rounded and the bases thereof are curved to merge with adjacent portions of the die faces. The die members are thus formed to give a wave-like form to the bend within the tube and merge the bend evenly with the remainder of the tube.

Simultaneously with the bending operation the tube is compressed about the enclosed wires to give the joint substantially the same cross sectional form as that of the previous joint, the bending humps of the die members and the adjacent groove surfaces being formed to accomplish this, as shown, in Fig. 9. Outwardly of the bending humps the groove surfaces of the two die members extend longitudinally in straight, parallel lines spaced apart sufficiently to avoid crushing adjacent portions of the tube during a bending and compressing operation. The performance of the transverse compressing operation simultaneously with the bending of the tube by a single closing movement of a pair of dies is a very desirable feature. The compression of the tube occurs during the bending operation and continues slightly after the completion of the latter. Thereby the metal of the tube is ironed out and its continuity is maintained along the bend.

The die members 12 and 13 are shown as designed for forming one complete bend with each operation. They are advanced along the tube to form a series of bends, each merging with the next in the series so that the series presents a continuous, even, wave-like form within the tube. The degree to which the tube and wire are bent out of alinement with the joint axis will vary according to different requirements and according to the wire and tube sizes and the materials used. The die members are designed to give the desired depth and length to the bend of the strands within the tube. Along the entire length of the bend the metal of the tube is in intimate binding contact with the wire strands around approximately three quarters of the circumference of each strand. Such a joint possesses greater tensile strength than the wire alone, and its conductivity is fully equal to that of the wire.

Both joints are formed entirely without solder or other cementing material. It costs little to prepare the sleeve for connection and requires very little equipment for making the joint. In many cases the compression operations may be performed by hand pliers designed for the work. For forming small joints the die faces may be designed to make a plurality of the wave-like bends with each operation instead of a single bend. The invention provides a simple and thoroughly satisfactory way of joining wires, cables, rods or the like from the smallest sizes up to one inch or more in diameter.

As shown in the illustrations of the completed joint the wires have no appreciable reduction or distortion of cross section within the sleeve. The wires are of harder metal than the metal of the sleeve prior to compression of the latter so that the wires form high compression resisting cores to cooperate with the dies in molding the metal of the sleeve. There is no yield of the metal of the wires beyond its elastic limit. Consequently the condition of the metal of the wires is kept substantially uniform both within and without the sleeve.

In the claims the term "strand" is meant to include a wire, rod, cable, or the like. It is not meant to designate component elements forming such parts, as, for example, individual filaments assembled or interwound to form a cable.

While I have disclosed a very satisfactory method and apparatus for the compression of the tube or sleeve it will be understood that the compression may be performed in other ways and by the employment of apparatus of various forms.

What I claim is:

1. A high tension resisting joint structure comprising a seamless metal sleeve, and companion lengths of hard metal strand extending longitudinally into said sleeve in side to side contact and forming high compression resisting core-forming members for the sleeve, the metal of the sleeve being transversely upset molded and compacted against and around said core members to a high tensile strength and forced into even, tight binding contact with the periphery of each core member along the enclosed length of the member by transverse pressure applied to approximately the entire cross sectional periphery of the sleeve to thereby permanently join the strand lengths and substantially close the interior of the joint in cross section, the strand metal being of sufficient hardness to prevent yield thereof beyond its elastic limit under said transverse pressure.

2. A high tension resisting joint structure comprising a seamless metal tube, and companion lengths of hard metal strand extending longitudinally into said tube in side to side contact and forming high compression resisting core-forming members for the tube, the tube and enclosed strand lengths being formed with a wave-like bend, the metal of the tube being transversely upset molded and compacted against and around said core members to a high tensile strength and forced into even, tight binding contact with the periphery of each core member along the length of said bend by transverse pressure applied to approximately the entire cross sectional periphery of the tube to thereby join the strand lengths and substantially close the interior of the joint in cross section, the strand metal being of sufficient hardness to prevent yield thereof beyond its elastic limit under said transverse pressure.

3. A joint structure comprising a seamless metal sleeve, and companion lengths of strand extending longitudinally into said sleeve in substantially parallel relation and forming compression-resisting core-forming members for the sleeve, the metal of the sleeve being transversely upset, molded and compacted against and around said core members to increased tensile strength and forced into even, tight-binding contact with the periphery of each core member along the enclosed length of the member by transverse pressure applied to approximately the entire cross sectional periphery of the sleeve to thereby permanently join the strand lengths to the sleeve, the strand material being of sufficient hardness to prevent material internal yield thereof under said transverse pressure which molds the metal of the sleeve.

4. A joint structure comprising a seamless metal tube, and companion lengths of strand extending longitudinally into said tube in substantially parallel relation and forming compression-resisting core members and formed with a wave-like bend within the tube, the metal of the tube being transversely upset, molded and compacted against and around said core members to increased tensile strength and forced into even, tight-binding contact with the periphery of each core member along said bend by transverse pressure applied to approximately the entire cross sectional periphery of the tube to thereby permanently join the strand lengths, the strand material being of sufficient hardness to prevent appreciable internal yield thereof under said transverse pressure which molds the tube metal.

JOSEPH L. MRAZ.